(12) United States Patent
Ford et al.

(10) Patent No.: US 11,750,595 B2
(45) Date of Patent: Sep. 5, 2023

(54) MULTI-COMPUTER PROCESSING SYSTEM FOR DYNAMICALLY EVALUATING AND CONTROLLING AUTHENTICATED CREDENTIALS

(71) Applicant: Bank of America Corporation, Charlotte, NC (US)

(72) Inventors: Stuart David Ford, Slapton (GB); Ricardo Varanda, Reading (GB); Andrew Paul Montgomery, London (GB); Sanjay Bhanu, Camberley (GB)

(73) Assignee: Bank of America Corporation, Charlotte, NC (US)

( * ) Notice: Subject to any disclaimer, the term of this patent is extended or adjusted under 35 U.S.C. 154(b) by 59 days.

(21) Appl. No.: 17/171,225

(22) Filed: Feb. 9, 2021

(65) Prior Publication Data

US 2022/0255917 A1 Aug. 11, 2022

(51) Int. Cl.
*H04L 9/40* (2022.01)

(52) U.S. Cl.
CPC ........ *H04L 63/083* (2013.01); *H04L 63/0869* (2013.01); *H04L 63/101* (2013.01); *H04L 63/102* (2013.01); *H04L 63/107* (2013.01)

(58) Field of Classification Search
CPC . H04L 63/083; H04L 63/0869; H04L 63/101; H04L 63/102; H04L 63/107
See application file for complete search history.

(56) References Cited

U.S. PATENT DOCUMENTS

| | | | |
|---|---|---|---|
| 6,820,082 B1 | 11/2004 | Cook et al. | |
| 7,346,840 B1 | 3/2008 | Ravishankar et al. | |
| 7,512,810 B1 | 3/2009 | Ryan | |
| 7,870,596 B2 | 1/2011 | Schackow et al. | |
| 8,527,881 B2 | 9/2013 | Selig | |
| 8,621,549 B2 | 12/2013 | Lim | |
| 8,935,755 B1 | 1/2015 | Kay | |
| 9,081,866 B2 | 7/2015 | Coleman et al. | |
| 9,172,705 B1 * | 10/2015 | Kong | H04L 63/101 |
| 10,079,821 B2 | 9/2018 | Mishra et al. | |
| 10,191,908 B1 * | 1/2019 | Dodke | G06F 21/556 |
| 2012/0317642 A1 | 12/2012 | Royal et al. | |
| 2015/0207800 A1 * | 7/2015 | Jitkoff | H04W 12/37 726/8 |
| 2021/0243174 A1 * | 8/2021 | Kaznocha | H04L 63/0815 |
| 2022/0030422 A1 * | 1/2022 | Stewart | H04W 12/08 |
| 2022/0255917 A1 * | 8/2022 | Ford | H04L 63/102 |
| 2023/0026368 A1 * | 1/2023 | Silverstein | H04L 65/4015 |

* cited by examiner

*Primary Examiner* — Harris C Wang
(74) *Attorney, Agent, or Firm* — Banner & Witcoff, Ltd.

(57) ABSTRACT

Systems for credential evaluation and control are provided. In some examples, a request to access data via a website may be received. The request may include a username. A browser extension embedded in the web browser used to request the data via the website may be triggered and one or more credential evaluation functions may be executed. An event record associated with the request to access data may be generated. The event record may be analyzed to determine a designation associated with the website and a designation associated with user credentials provided with the request to access the data. The designation of the website and the designation of the credentials may be compared to determine whether the designations match. If so, access to the requested data may be provided. If not, one or more mitigating actions may be identified and executed.

18 Claims, 12 Drawing Sheets

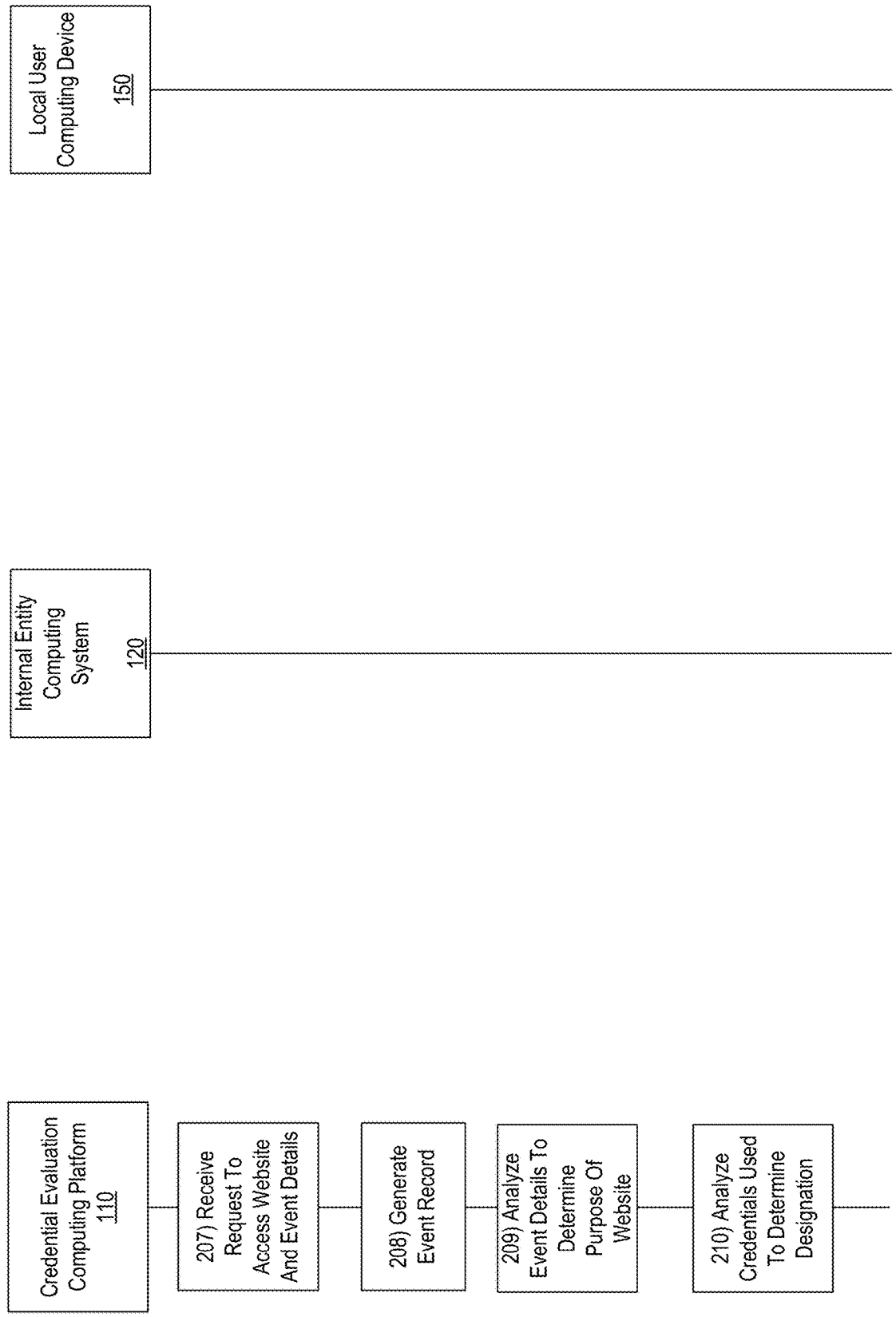

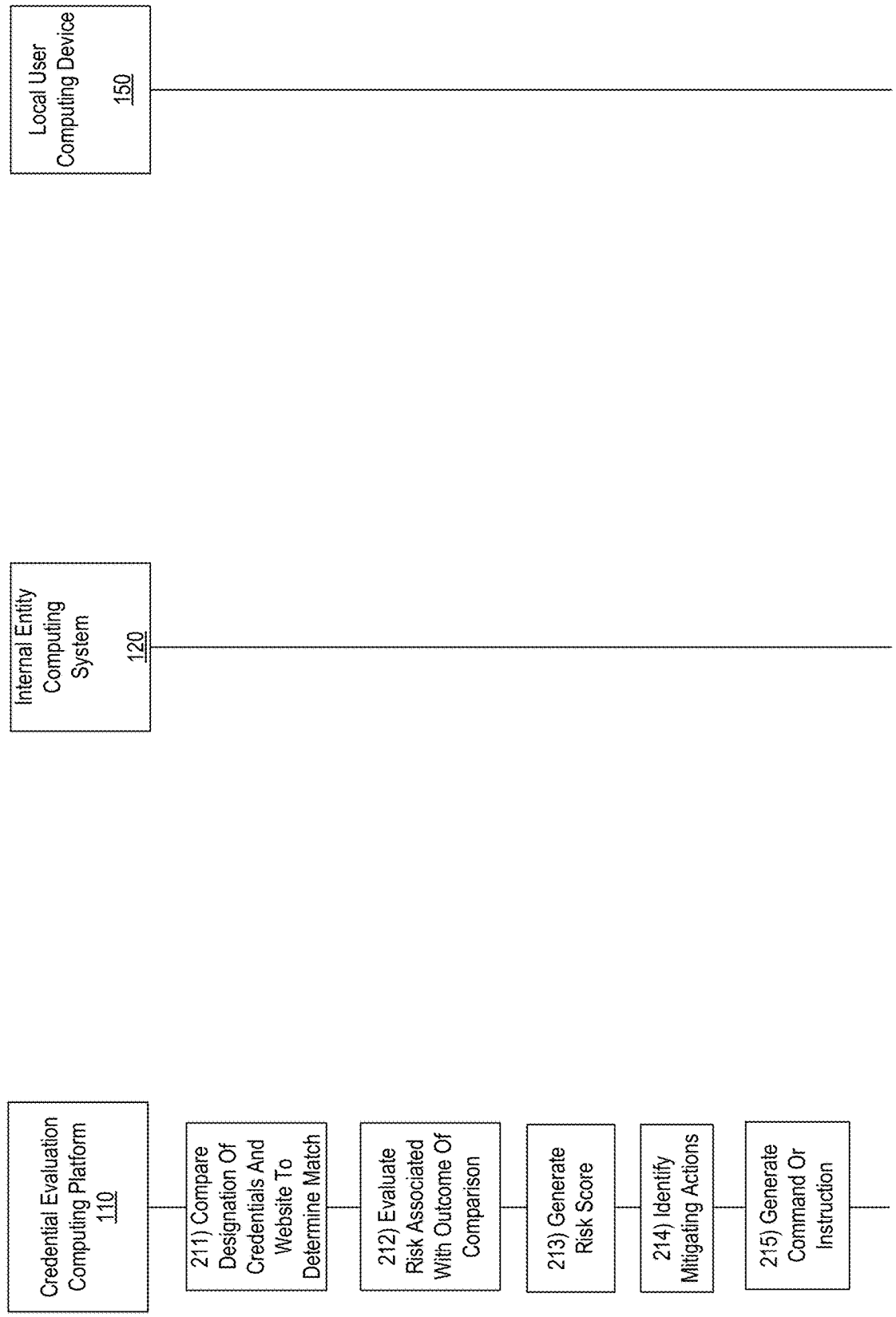

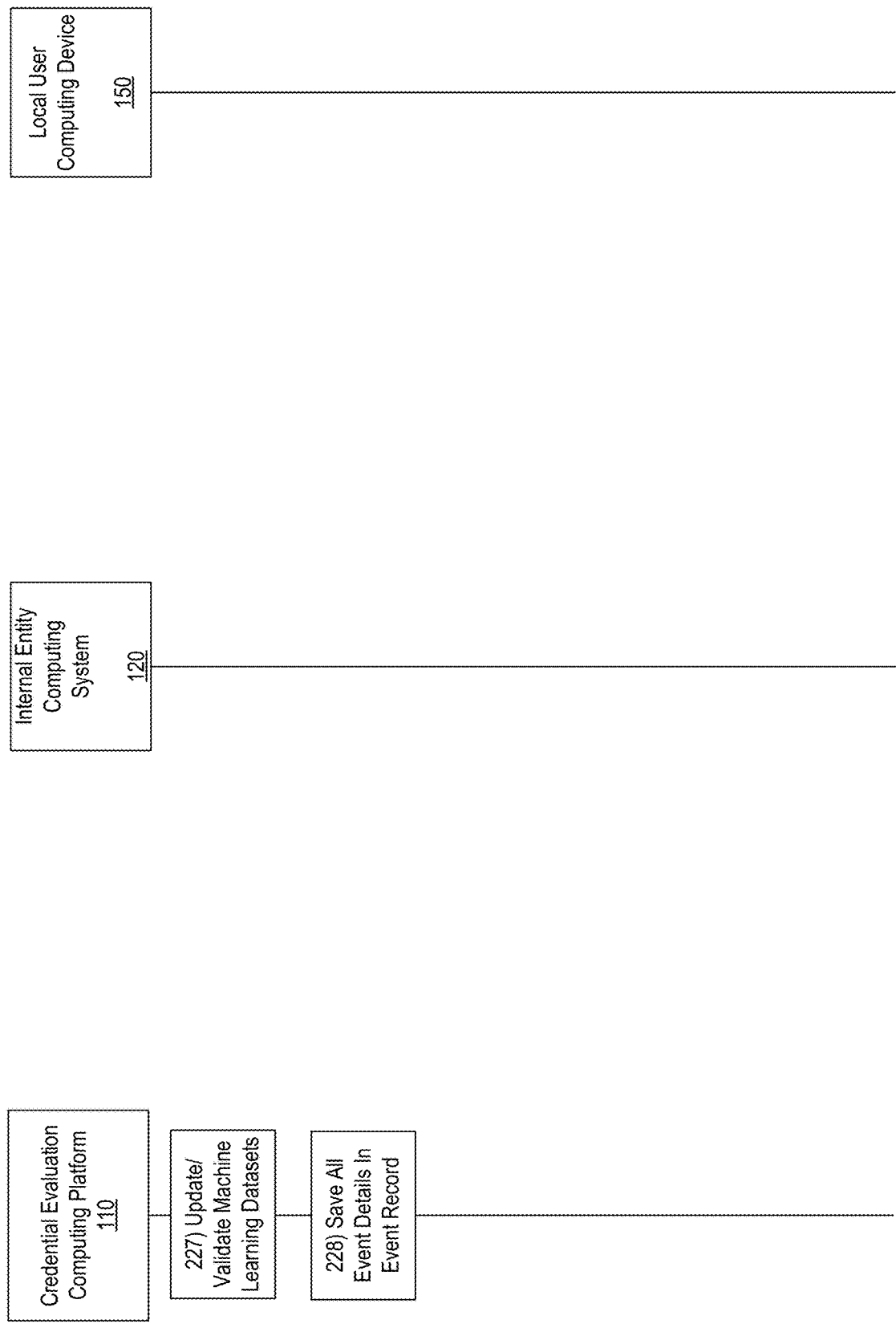

MULTI-COMPUTER PROCESSING SYSTEM FOR DYNAMICALLY EVALUATING AND CONTROLLING AUTHENTICATED CREDENTIALS

BACKGROUND

Aspects of the disclosure relate to electrical computers, systems, and devices performing credential evaluation and control.

Users access many websites throughout a typical day. Many of these websites require credentials (e.g., username and password) to access data. Many enterprise organizations provide or use a corporate identifier for each user to access business related websites, systems, and the like so that users do not use personal credentials to access corporate or business systems, websites, or the like. Several of these organizations also do not permit the use of a corporate identifier for personal or non-business related use. However, because of the number of sites requiring usernames and passwords, users often reuse credentials in order to aid in remembering their authentication data. Unauthorized users are often able to capture user credentials and attempt to access data without a user's permission.

In order to reduce risk associated with unauthorized users accessing user credentials, many enterprise organizations require users to have business credentials that are different from personal credentials. For instance, in some examples, an enterprise organization may assign usernames to each employee or user within the enterprise organization. These usernames may be required to access one or more systems implemented by the enterprise organization. However, the enterprise organization may have a policy that does not permit use of that username for non-business (e.g., non-enterprise organization related or personal) use. In order to reduce or simplify the number of credentials a user has, the user may attempt to use that business username for non-business uses, in violation of the policy.

Accordingly, it would be advantageous to identify instances of website or data access by a user via a personal or non-business website using business credentials in order to reduce or eliminate risk associated with unauthorized use of the credentials.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with evaluating credential use for various websites to determine whether they are for personal or business use.

For instance, in some examples, a request to access data may be received. The request may include a username or username and password. The request to access data may be intercepted or transmitted for evaluation based on a browser extension embedded in the web browser used to request access to the data. The browser extension may initiate one or more credential evaluation functions.

For instance, an event record associated with the request to access data may be generated. The event record may include the uniform resource locator (URL) of the website through which access is requested, credentials used, and the like. In some examples, the event record may include additional event details, such as time, date, device identifier, and the like.

The event record may be analyzed to determine a designation associated with the URL or website. For instance, a business or personal designation may be assigned to the website. Additionally or alternatively, content of the website may be analyzed (e.g., using machine learning) to determine a designation.

The event record may be further analyzed to determine whether credentials provided correspond to business credentials assigned by or used for enterprise organization related functions, or are other credentials that may be used for non-enterprise organization related or personal purposes.

The designation of the website and the designation of the credentials may be compared to determine whether the designations match. If so, access to the requested data may be provided. If not, one or more mitigating actions may be identified and executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing credential evaluation and control functions in accordance with one or more aspects described herein;

DETAILED DESCRIPTION

Figure 1A:
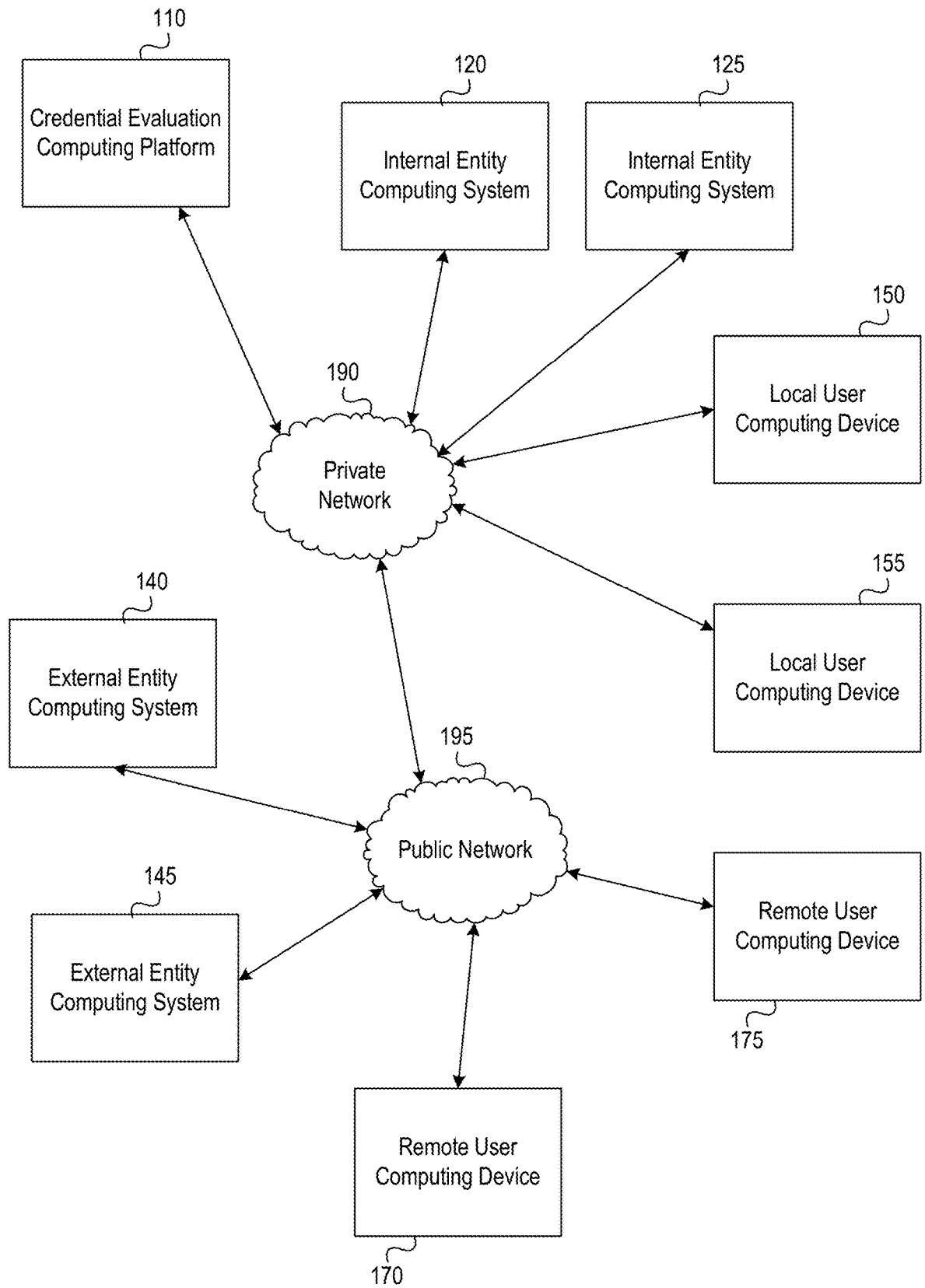
FIGS. 1A and 1B depict an illustrative computing environment for implementing credential evaluation and control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, evaluating and controlling user credential use for business or enterprise organization-related purposes is an important aspect of preventing or reducing unauthorized use. Accordingly, detecting occurrences of inappropriate credential use, particularly in real-time or near real-time, in order to promptly assess risk and execute mitigating actions is advantageous.

Arrangements described herein are related to evaluating user credentials input to access a website or data in view of a designation associated with the website or data. For instance, a website may have a designation of "business" or "personal." A website having a business designation may be a website identified or meeting criteria for use in the course of a user's business, to complete one or more job requirements, provided by the employer of the user, or the like. A website having a personal designation may be a website meeting criteria indicating that the website is not necessary to complete one or more job functions, is not provided by the employer, or is not need in the course of the user's business. In some examples, the designation associated with the website may be, at least in part, based on a job function of a user. For instance, a user who provides a communication function for the enterprise organization via social media may need to access social media sites in order to perform his or her job function. In that arrangement, the social media sites may be designated as business websites for that particular user. Alternatively, another employee who does not have a job that includes functions associated with social media might not need to access social media sites during the course of business. Accordingly, for that user, social media sites may be designated as personal. Various other designation differences based on job function may be provided without departing from the invention.

When a user attempts to access a website or data associated therewith, the request may trigger a browser extension embedded in a web browser to perform one or more credential evaluation functions. For instance, an event record recording the request to access the data or website may be generated and stored. In some examples, additional event details may also be captured, such as uniform resource locator (URL) of the website, time, date, device being used, and the like.

In some examples, the URL may be analyzed to determine whether it has a first designation (e.g., business) or a second designation (e.g., personal). For instance, URLs previously accessed may have been categorized and flagged with a designation. Additionally or alternatively, the website may be analyzed (e.g., using machine learning) to determine a designation. In some examples, additional information such as date, time, job function of the user, content of the website, and the like, may be analyzed to determine the designation.

The event record may be further analyzed to determine a designation of the credentials used in the request. For instance, the credentials used may be analyzed to determine whether they correspond to a first designation (e.g., business) or a second designation (e.g., personal). In some examples, business credentials may be provided by the enterprise organization or employer, such as an enterprise organization email address, enterprise organization identifier, or the like. Additionally or alternatively, the business credentials may be selected by the user but designated for business use (e.g., uses associated with one or more job functions, uses associated with accessing systems of the employer, or the like). Personal credentials may, in some examples, be all other credentials of the user not matching the business credentials. Those may be designated as having a second designation (e.g., personal).

In some examples, the designation of the website may be compared to the designation of the credentials to determine whether there is a match. If so, access may be provided. If not, one or more mitigating actions may be identified and executed.

These and various other arrangements will be discussed more fully below.

Figure 1B:
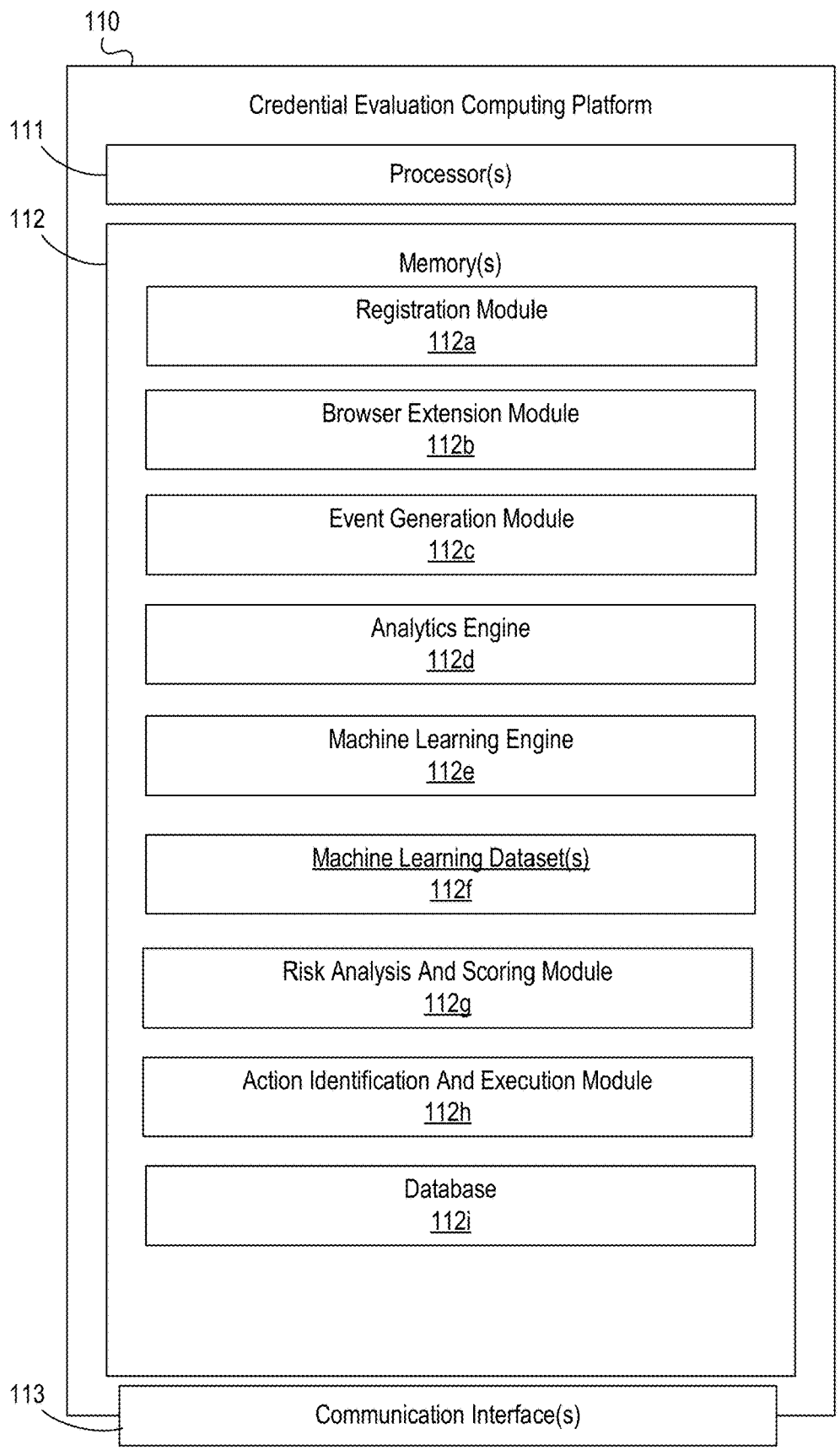

FIGS. 1A-1B depict an illustrative computing environment for implementing and using a credential evaluation and control system in accordance with one or more aspects described herein. Referring to FIG. 1A, computing environment 100 may include one or more computing devices and/or other computing systems. For example, computing environment 100 may include credential evaluation computing platform 110, internal entity computing system 120, internal entity computing system 125, a first local user computing device 150, a second local user computing device 155, a first remote user computing device 170, a second remote user computing device 175, a first external entity computing system 140 and a second external entity computing system 145. Although two internal entity computing systems 120, 125, two local user computing devices 150, 155, two remote user computing device 170, 175 and two external entity computing systems are shown, more or fewer devices or systems may be used without departing from the invention.

Credential evaluation computing platform 110 may be configured to provide intelligent, dynamic, credential evaluation and control functions. For instance, credential evaluation system may execute one or more credential evaluation and control functions based on a triggering event detected by a browser extension embedded in a web browser through which a request to access a website or data was received. In some examples, the triggering event may include a username being input, a username and password being input, a field requesting a username, or the like. The browser extension may then cause one or more functions to be executed (e.g., by the credential evaluation computing platform). For instance, an event and associated event record may be generated. The event (e.g., a request to access a website or data) and associated event details may be stored in the event record in a database and analyzed to determine one or more actions to execute. In some examples, event details may include time, date, day of week, uniform resource locator (URL) associated with the website, device through which the request was received, job function of the user requesting access, and the like.

For instance, the event details may be analyzed to determine whether the website corresponds to a website used for business purposes or a website used for personal purposes. In some examples, one or more websites may be identified or designated as "business" or "personal" and a flag associated with each designation may be used in analyzing the event details. Additionally or alternatively, machine learning may be used to analyze a website to determine (e.g., based on patterns or sequences in historical data) whether the website is a business or personal website.

After determining a designation for a website, credentials provided to the website may be analyzed to determine whether the credentials correspond to business credentials or personal credentials. For instance, the credential evaluation computing platform 110 may analyze the credentials to determine whether they match credentials associated with business use and having a business designation or are designated for personal use.

The credential evaluation computing platform 110 may then compare the designation of the website to the designation of the credentials to determine whether the designations match. If so, access may be provided. If not, a risk may be determined and one or more mitigating actions may be identified and executed.

For instance, if the appropriate or matching credentials are used, the credential evaluation computing platform 110 may provide or enable the requested access to the website. Alternatively, if the designation of the credentials does not match the identified purpose or designation of the website, in some examples, the requested access to the website may be denied or blocked. Additionally or alternatively, the access may be provided but a record of the access and the credentials used may be recorded (e.g., stored with the event details in the database) and one or more notifications may be generated and transmitted to one or more devices.

In some examples, machine learning may be used to evaluate whether appropriate credentials have been used. For instance, machine learning may be used to identify patterns or sequences of data indicating that that credentials match the category of website (e.g., based on time of day, day of week, or the like).

While aspects described above relate to analyzing websites and credentials based on a detected occurrence, in some examples, all requests to access a website may trigger execution of the functions and processes associated with the browser extension.

Internal entity computing system 120 and internal entity computing system 125 may be computing devices associated with the entity or enterprise organization implementing the credential evaluation computing platform 110. In some examples, internal entity computing system 120 and/or internal entity computing system 125 may include systems associated with various systems, applications, or the like within or hosted by the enterprise organization and may include or store user credentials, user information, and the like. In some examples, internal entity computing system 120, 125 may host one or more applications accessed by or accessible to the user and for which credential evaluation may be executed.

External entity computing system 140, external entity computing system 145, and the like may be computing systems or devices associated with an entity external to the enterprise organization. For instance, external entity computing system 140 and/or external entity computing system 145 may be associated with an entity different from the enterprise organization implementing the credential evaluation computing platform 110 and may host one or more applications associated with one or more websites being accessed by or accessible to users of the enterprise organization.

Local user computing device 150, local user computing device 155, and the like, may be computing devices associated with or used by one or more employees of the enterprise organization to perform various job functions. The computing devices 150, 155 may include various types of user computing devices and may display one or more user interfaces associated with a website, receive user credential data, and the like.

The remote user computing device 170 and remote user computing device 175 may be used to communicate with, for example, one or more systems, computing platforms, devices, or the like. In some examples, remote user computing device 170 and/or remote user computing device 175 may be devices associated with a user but not owned by the enterprise organization. In some examples, users may access one or more systems of the entity (e.g., internal computing system 120, 125) via remote user computing device 170 or remote user computing device 175 and that access may be analyzed (e.g., with user permission).

Computing environment 100 also may include one or more computing platforms. For example, and as noted above, computing environment 100 may include credential evaluation computing platform 110. As illustrated in greater detail below, credential evaluation computing platform 110 may include one or more computing devices configured to perform one or more of the functions described herein. For example, credential evaluation computing platform 110 may include one or more computers (e.g., laptop computers, desktop computers, servers, server blades, or the like).

As mentioned above, computing environment 100 also may include one or more networks, which may interconnect one or more of credential evaluation computing platform 110, internal entity computing system 120, internal entity computing system 125, external entity computing system 140, external entity computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, credential evaluation computing platform 110, internal entity computing system 120, internal entity computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect credential evaluation computing platform 110, internal entity computing system 1 120, internal entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., credential evaluation computing platform 110, internal entity computing system 1 120, internal entity computing system 2 125, local user computing device 150, local user computing device 155) with one or more networks and/or computing devices that are not associated with the organization. For example, external entity computing system 140, external entity computing system 145, remote user computing device 170, remote user computing device 175, might not be associated with an organization that operates private network 190 (e.g., because external entity computing system 140, external entity computing system 145, remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, external entity computing system 145, remote user computing device 170, remote user computing device 175, to private network 190 and/or one or more computing devices connected thereto (e.g., credential evaluation computing platform 110, internal entity computing system 120, internal entity computing system 125, local user computing device 150, local user computing device 155).

Referring to FIG. 1B, credential evaluation computing platform 110 may include one or more processors 111, memory 112, and communication interface 113. A data bus may interconnect processor(s) 111, memory 112, and communication interface 113. Communication interface 113 may be a network interface configured to support communication between credential evaluation computing platform 110 and one or more networks (e.g., private network 190, public network 195, or the like). Memory 112 may include one or more program modules having instructions that when executed by processor(s) 111 cause credential evaluation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of credential evaluation computing platform 110 and/or by different computing devices that may form and/or otherwise make up credential evaluation computing platform 110.

For example, memory 112 may have, store and/or include a registration module 112a. Registration module 112a may store instructions and/or data that may cause or enable the credential evaluation computing platform 110 to receive data related to one or more users (e.g., employees of the enterprise organization implementing the credential evaluation module). In some examples, the registration information may include name of the user, unique identifier associated with the user, business credentials assigned to or used by the user, device identifier(s) associated with the user, and the like. In some examples, registration information may include job function information (e.g., role, department or business group, key responsibilities, and the like). The registration data may be provided by a user (e.g., received from one or more of local user computing device 150, local user computing device 155, remote user computing device 170, remote user computing device 175, or the like). Additionally or alternatively, registration data may be retrieved from one or more databases storing various types of information and associated with internal entity computing system 120 and/or internal entity computing system 125.

Credential evaluation computing platform 110 may further have, store, and/or include browser extension module 112b. Browser extension module 112b may store instructions and/or data that may execute one or more functions or steps upon detection of a triggering occurrence or event. For instance, a browser extension may be embedded in one or more browsers and, upon detecting a triggering occurrence (e.g., a website having a username field, input of user credentials, or the like), the browser may call out to the browser extension module 112b to execute the steps or functions described herein (e.g., determine whether the website is for business or personal purposes, evaluation credentials provided, or the like). Different browser extensions may be used for different web browsers without departing from the invention.

Credential evaluation computing platform 110 may further have, store and/or include event generation module 112c. Event generation module 112c may store instructions and/or data that may cause or enable the credential evaluation computing platform 110 to generate an event record associated with a triggering occurrence. The event record may be stored in a database, such as database 112i. Event generation module 112c may generate an event record including one or more event details, such as URL of a website being accessed, credentials input, time of day, day of week, user requesting access, device from which the request was received, and the like.

Credential evaluation computing platform 110 may further have, store and/or include analytics engine 112d. Analytics engine 112d may store instructions and/or data that may cause or enable the credential evaluation computing platform 110 to evaluate data from the event record to determine whether appropriate credentials are being used. For instance, the website being accessed may be evaluated to determine whether it is flagged with a business or personal designation. Additionally or alternatively, machine learning may be used to evaluate the website to determine a purpose or designation. Further, the event record and event details may be analyzed to identify credentials used in requesting access via the website. The credentials may be evaluated to determine whether they correspond to credentials having a business or personal designation and whether the designation of the credentials matches the designation of the website being accessed. In some examples, machine learning may be used to determine whether the credentials being used are appropriate (e.g., based on patterns or sequences identified in additional event details).

In some examples, machine learning may be used to identify a purpose or designation of a website, determine whether appropriate credentials are being used, and the like. Accordingly, credential evaluation computing platform 110 may further have, store and/or include a machine learning engine 112e and machine learning datasets 112f. Machine learning engine 112e and machine learning datasets 112f may store instructions and/or data that may cause or enable credential evaluation computing platform 110 to identify a purpose or designation for a website, determine whether appropriate credentials are being used, and the like. For instance, additional details such as time of day, day or week, job functions or roles of the user, or the like, may be analyzed using machine learning to determine whether appropriate credentials are being used. Machine learning datasets 112f may be generated based on analyzed data (e.g., data from previously received data, and the like), raw data, and/or received from one or more outside sources.

The machine learning engine 112e may receive website data, event data, and the like, and, using one or more machine learning algorithms, may generate one or more machine learning datasets 112f. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112e may analyze data to identify patterns of activity, sequences of activity, and the like, to generate one or more machine learning datasets 112f.

In some examples, the machine learning datasets 112f may include machine learning data linking, for example, particular event details to a purpose or set of credentials. For instance, use of personal credentials for a particular website on a weekday might not be appropriate and would be identified as not matching the purpose of the website, while use of personal credentials to access the website on a weekend might be appropriate and identified as matching. As additional data is received, the one or more machine learning datasets 112f may be updated and/or validated.

Credential evaluation computing platform 110 may further have, store and/or include risk analysis and scoring module 112g. Risk analysis and scoring module 112g may store instructions and/or data that may cause or enable the credential evaluation computing platform 110 to evaluate the website being accessed, credentials being used, and the like, to determine risk associated with the attempted access and generate a risk score. For instance, machine learning may be used to evaluate risk associated with a particular website, risk associated with using unmatched credentials for that website, and the like, to generate a risk score associated with the request for access.

Credential evaluation computing platform 110 may further have, store and/or include action identification and execution module 112h. Action identification and execution module 112h may store instructions and/or data that may cause or enable the credential evaluation computing platform 110 to identify one or more actions for execution and cause execution of the one or more actions. For instance, based on a generated risk score, one or more actions to mitigate risk may be identified. Some example actions may include generating and transmitting a notification to the user computing device or a supervisor user computing device identifying the attempted access and notifying the user that unmatched credentials should not be used, blocking or preventing access the website requested, displaying a user interface indicating that unmatched credentials are being used, and the like. Action identification and execution module 112h may generate an instruction or command to execute the one or more actions and may transmit the instruction for execution or may cause execution of the instruction or command.

Credential evaluation computing platform 110 may further have, store and/or include one or more databases 112i. Database 112i may store data including events detected, event details, historical data related to website access attempts, risk scores generated, mitigating actions identified and/or executed, and the like.

FIGS. 2A-2F depict one example illustrative event sequence for implementing and using credential evaluation and control functions in accordance with one or more aspects described herein. The events shown in the illustrative event sequence are merely one example sequence and additional events may be added, or events may be omitted, without departing from the invention.

At step 201, registration data may be received. For instance, users, such as employees of an enterprise organization, may register with or be registered with credential evaluation computing platform 110. Registration data may include name of user, unique identifier associated with user, device identifiers associated with one or more devices of a user, business designated credentials associated with the user, job duties or roles associated with the user, and the like. This information may be used to determine whether access to a website is for a business or personal purpose, whether credentials being used are appropriate, and the like. Various other information may be provided during registration without departing from the invention.

At step 202, a registration entry may be generated. For instance, a database may be modified to include an entry associated with the registration data for the user. The entry may include a plurality of data elements associated with the user, user devices, and the like.

At step 203, a request to access a website may be received by, for instance, local user computing device 150. The request to access a website may be analyzed, at step 204, to determine whether a triggering occurrence has been detected. For instance, a browser extension may be embedded in one or more web browsers such that, if the website requested includes fields to input a username and password, a username alone, if a username and password are input to request access to the website, or the like, the browser may intercept the request and determine that a triggering occurrence has been detected. One or more credential evaluation functions may be activated or initiated. For instance, the credential evaluation functions may include one or more of the functions or processes described with respect to FIGS. 2A-2F and/or FIG. 3.

Based on the triggering occurrence, at step 205, a connection may be established between the local user computing device 150 and the credential evaluation computing platform 110. For instance, a first wireless connection may be established between the local user computing device 150 and the credential evaluation computing platform 110. Upon establishing the first wireless connection, a communication session may be initiated between credential evaluation computing platform 110 and local user computing device 150.

At step 206, the request to access the website may be transmitted to the credential evaluation computing platform 110. For instance, the request to access the website may be transmitted during the communication session initiated upon establishing the first wireless connection.

With reference to FIG. 2B, at step 207, the request to access the website, as well as any event details, may be received by the credential evaluation computing platform 110. For instance, a date, time, user or user device making the request, and the like, may be received with the request to access the website.

At step 208, an event record may be generated by the credential evaluation computing platform 110. For instance, an event record including the detection of the triggering occurrence, as well as any event details (e.g., URL of website, date, time, user, user device internet protocol address, and the like) may be generated and stored. In some examples, data up to the point of authentication may be captured and stored. For instance, data input, and the like, may be captured up to the point of authentication. However, whether the user credentials are authentic might be not be captured and stored.

At step 209, the event details may be analyzed to determine a purpose or designation associated with the website. For instance, the website may include a flag designating it as having a first designation (e.g., "business") or a second designation (e.g., "personal"). In another example, the URL may be compared to a stored list of URLs having a "business" or "personal" designation to identify an appropriate designation for the website. Additionally or alternatively, machine learning may be used to analyze the website to determine a "business" or "personal" designation for the website. In some examples, additional details may be considered with respect to the designation of the website. For instance, on a weekday a website might be considered designated for business purposes while on a weekend it might be designated for personal purposes. Additionally or alternatively, job roles or functions associated with the user may be evaluated to determine the designation of the website. For instance, job function data may be retrieved from the registration module 112a and used to evaluate the website to determine an appropriate designation.

At step 210, the credentials used in the request to access the website (e.g., and stored in the event record) may be analyzed to determine whether they are designated business credentials or personal credentials. For instance, the enterprise organization may assign a username and/or username and password combination to a user for use in business purposes. Many enterprise organizations do not permit use of the business credentials for personal use to reduce the risk of unauthorized use. Accordingly, credential evaluation computing platform 110 may analyze the credentials used to determine whether they have a first designation (e.g., business) or a second designation (e.g., personal). In some examples, this determination may be based on a syntax, format, or the like, of the username. For instance, a username of "first.last@entity.com" or "first.last" might be the designated format for business credentials. Accordingly, the credentials in the event record may be compared to this format to determine whether the formats match and, if so, the credentials may be determined to be business credentials. Additionally or alternatively, the credentials may be compared to pre-stored credentials having a business designation. If the credentials match the credentials in the list, they may be considered to have a business designation and, if not, they may be designated as personal credentials.

With reference to FIG. 2C, at step 211, the designation of the credentials may be compared to the designation of the website to determine whether a match exists. In some examples, the comparison may include comparing designations and generating a binary output of "matched" or "unmatched." Additionally or alternatively, additional event details, factors, and the like, may be analyzed (e.g., using machine learning) to determine whether even unmatched credentials might be acceptable or have lower risk.

At step 212, the risk associated with the outcome of the comparison may be determined. For instance, if a binary output is provided, the risk may include "high risk" or "low risk" corresponding to "matched" or "unmatched," respectively. Additionally or alternatively, machine learning may be used to evaluate the risk based on the matched or unmatched determination, as well as additional event details. For instance, if a user is accessing a particular website on a particular day or at a particular time, the risk may be adjusted based on identified patterns or sequences of data indicating high or lower risk. In another example, machine learning may be used to evaluate risk including a user's job functions or role with respect to the website being accessed, credentials used, and the like. Various other examples of machine learning analysis of the data to determine risk may be used without departing from the invention.

At step 213, a risk score may be generated. For instance, based on the risk analysis performed at step 212, a risk score associated with the event may be generated. For instance, the risk score may be determine based on particulars of the website being accessed (e.g., content, security level, and the like). The risk score may consider data being accessed via the website (e.g., financial data may have higher risk associated with it than other types of data). In some examples, previous unauthorized activity associated with the website may be used to determine the risk score. In some examples, one or more factors (e.g., content, data, and the like) may each be scored and an overall score may be determined from the individual scores.

At step 214, one or more mitigating actions may be identified. For instance, a risk score may be compared to a plurality of mitigating action thresholds and, based on the comparison, one or more mitigating actions may be identified. For instance, if the risk score is within a first threshold, a notification may be transmitted to a user indicating that improper credentials were used. In another example, if the risk score is within another, higher risk threshold, the user may be prevented from accessing the website with the credentials. Various other example thresholds and mitigating actions may be used without departing from the invention.

At step 215, a command or instruction associated with the one or more mitigating actions may be identified. For instance, an instruction or command causing execution of the identified one or more mitigating actions may be generated.

Figure 2A:
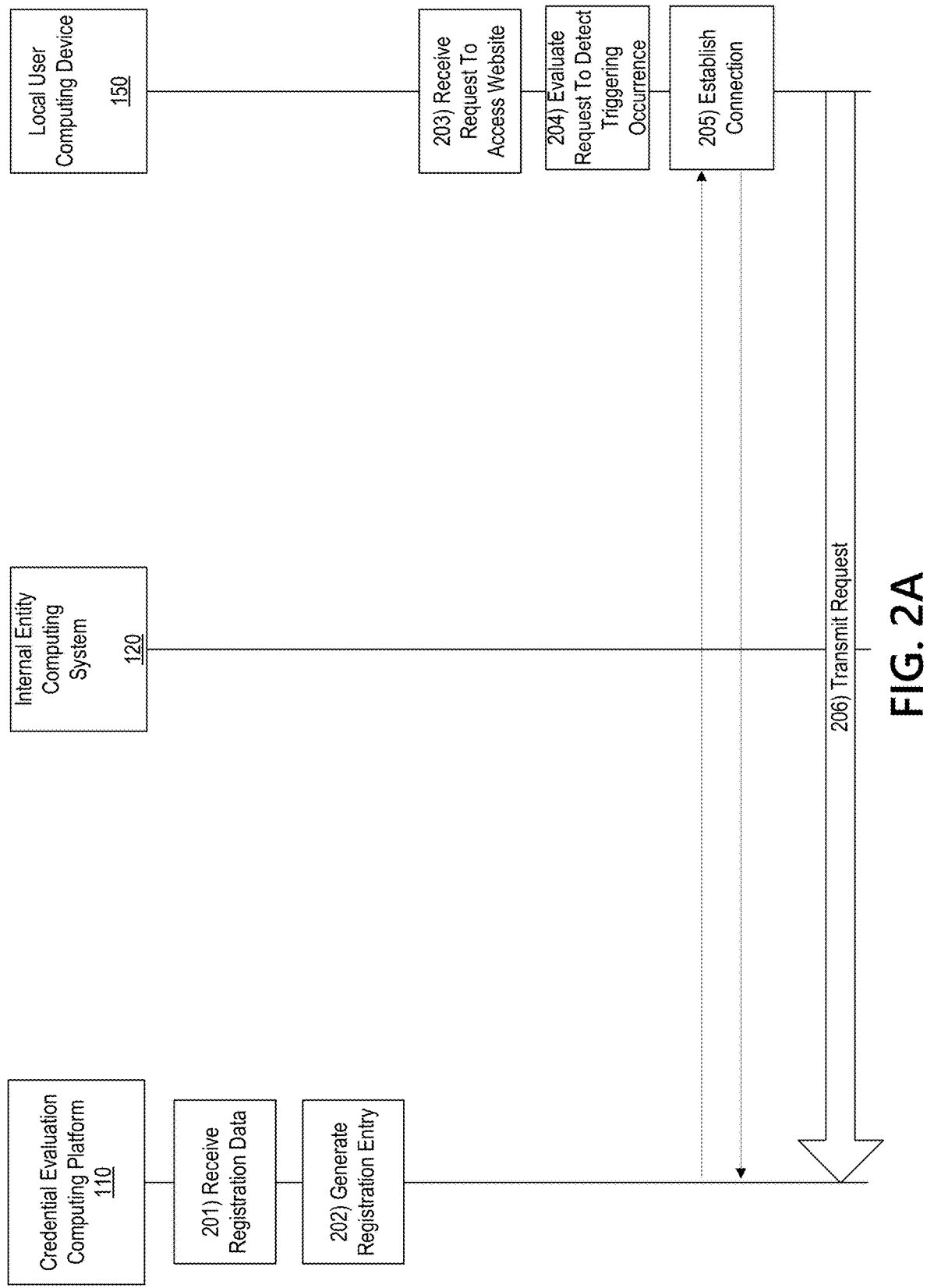
Figure 2D:
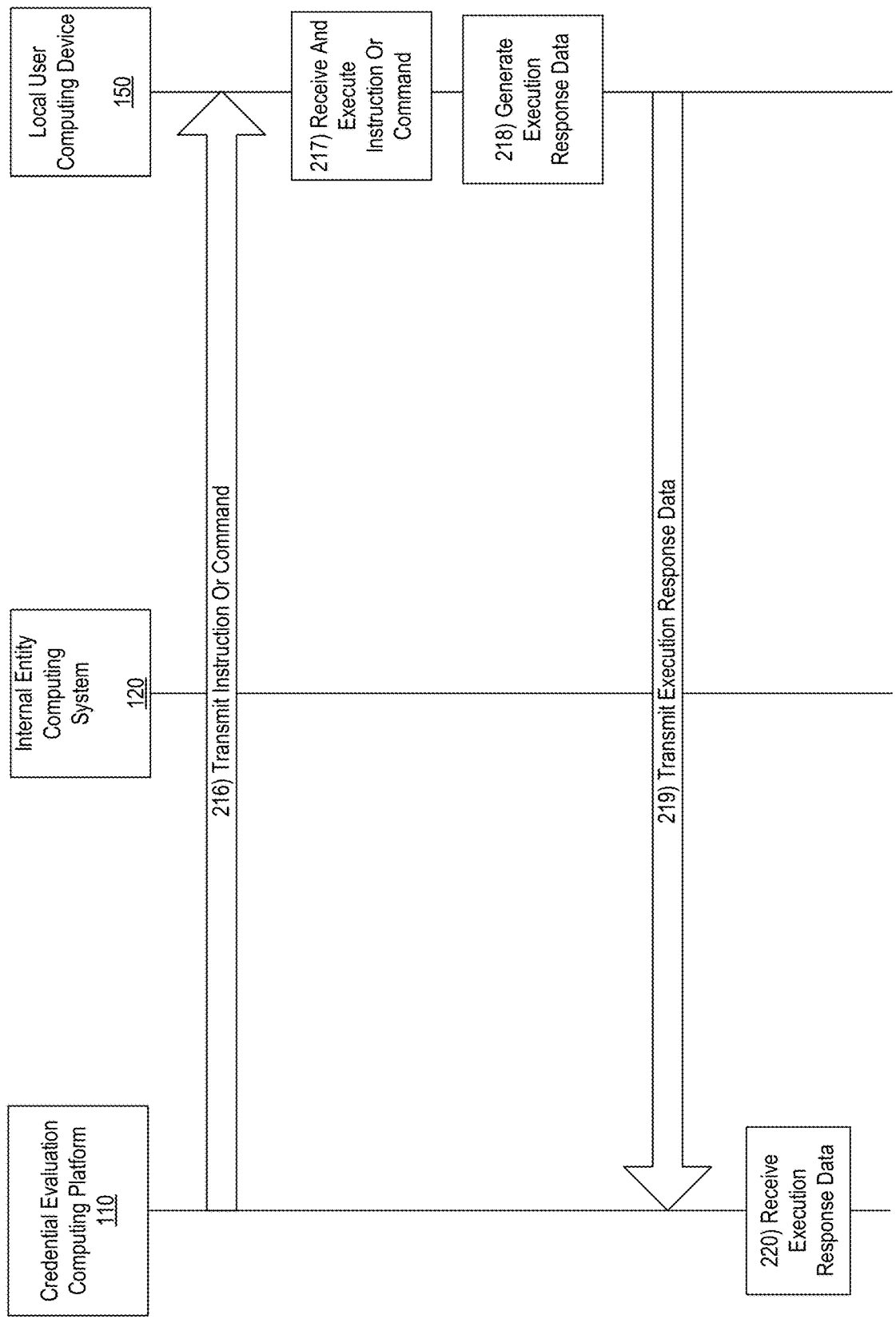

With reference to FIG. 2D, at step 216, the generated instruction or command may be transmitted from the credential evaluation computing platform 110 to the local user computing device 150. For instance, the generated instruction or command may be transmitted during the communication session initiated upon establishing the first wireless connection. In other examples, another wireless connection may be establishing and communication session initiated.

At step 217, the instruction or command may be received by the local user computing device 150 and executed. For instance, if the instruction or command includes causing display of a user interface including a notification that the user is using improper credentials, the instruction or command may be received and executed by the local user computing device 150 and the user interface may be displayed. In another example, if the instruction or command includes preventing access to the requested website, the instruction or command may be executed, thereby causing prevention of the user from accessing the website.

At step 218, execution response data may be generated. For instance, a user may be asked to acknowledge a notification received, acknowledge that improper credentials were used, and the like. Based on an acknowledgement, or other input data received from the user via the local user computing device 150, execution response data may be generated. Additionally or alternatively, a confirmation that the command or instruction was successfully executed may be generated as execution response data.

At step 219, the execution response data may be transmitted from the local user computing device 150 to the credential evaluation computing platform 110. In some examples, the execution response data may be transmitted during the communication session initiated upon establishing the first wireless communication session. In other examples, another wireless connection may be established and communication session initiated.

At step 220, the execution response data may be received by the credential evaluation computing platform 110.

Figure 2E:
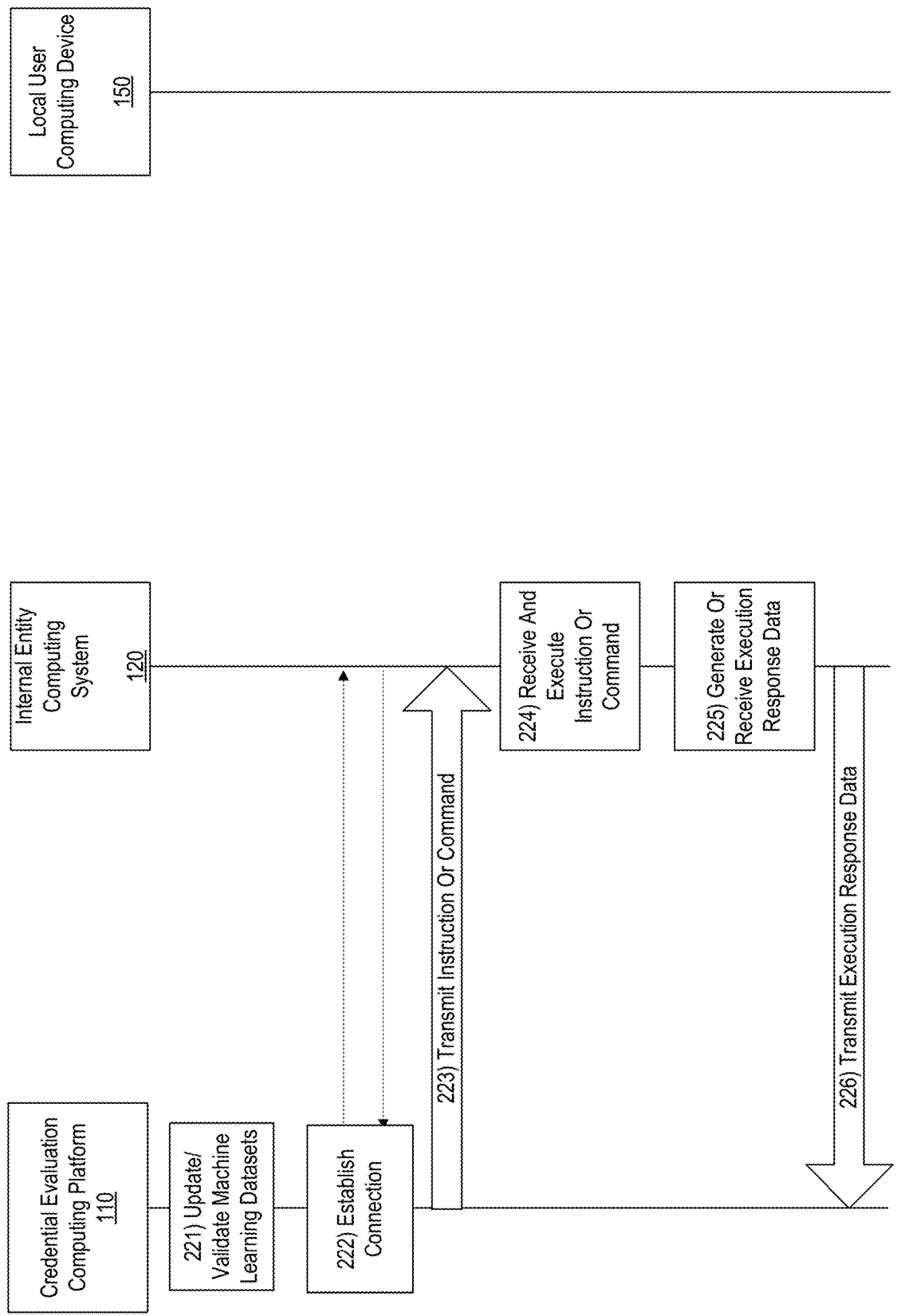

With reference to FIG. 2E, at step 221, one or more machine learning datasets may be updated and/or validated. For instance, the generated instruction or command, as well as any execution response data, may be used to update and/or validate one or more machine learning datasets. In some examples, additional user data may also be captured and used in updating and/or validating the one or more machine learning datasets.

In some examples, in addition to or in lieu of a command or instruction associated with one or more mitigating actions being transmitted to the local user computing device 150, one or more instructions or commands may be transmitted to another computing device or system for execution. For instance, an instruction or command to execute one or more mitigating actions may be transmitted to, for example, internal entity computing system 120.

Accordingly, at step 222, a connection may be established between the credential evaluation computing platform 110 and internal entity computing system 120. For instance, a second wireless connection may be established between the internal entity computing system 120 and the credential evaluation computing platform 110. Upon establishing the second wireless connection, a communication session may be initiated between credential evaluation computing platform 110 and internal entity computing system 120.

At step 223, the instruction or command may be transmitted from the credential evaluation computing platform 110 to the internal entity computing system 120. For instance, the instruction or command may be transmitted during the communication session initiated upon establishing the second wireless connection.

At step 224, the instruction or command may be received by internal entity computing system 120 and executed. For instance, if an identified mitigating action includes preventing a user from accessing a website or system (e.g., hosted by internal entity computing system 120) the instruction or command may be executed to prevent access.

At step 225, execution response data may be received or generated by internal entity computing system 120. For instance, an indication that the command or instruction was successfully executed and may be generated by internal entity computing system 120.

At step 226, the execution response data may be transmitted from the internal entity computing system 120 to the credential evaluation computing platform 110. For instance, the execution response data may be transmitted during the communication session initiated upon establishing the second wireless communication session. In some arrangements, another wireless communication session may be established and communication session initiated.

With reference to FIG. 2F, at step 227, one or more machine learning datasets may be updated and/or validated. For instance, the generated instruction or command, as well as any execution response data from the internal entity computing system 120, may be used to update and/or validate one or more machine learning datasets. In some examples, additional user and/or system data may also be captured and used in updating and/or validating the one or more machine learning datasets.

At step 228, all event details may be stored in the generated event record. For instance, the website being accessed, user requesting access, credentials used, time, date, determined risk score or level, mitigating actions identified, devices to which mitigating actions were transmitted, execution response data, and the like, may be stored in the event record to maintain an auditable trail of occurrences of improper credential use, actions taken, and the like.

Although aspects described herein are related to executing functions with respect to a local user computing device 150, other devices, such as remote user computing device 170, may be used without departing from the invention.

Figure 3:
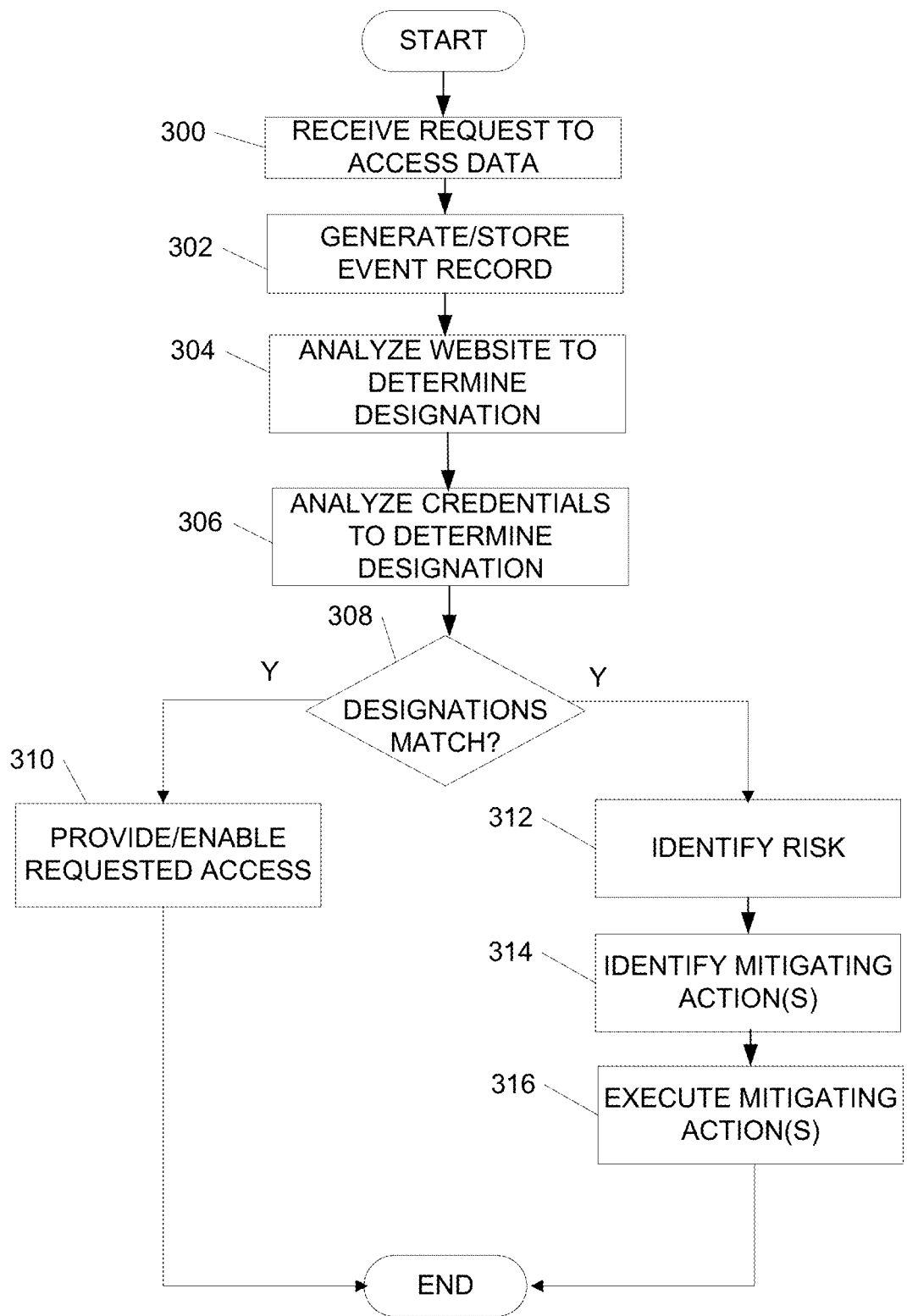
FIG. 3 depicts an illustrative method for implementing and using credential evaluation and control functions according to one or more aspects described herein.

FIG. 3 is a flow chart illustrating one example method of implementing credential evaluation and control functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, a request to access data may be received. For instance, a request to access data (e.g., via a particular website) may be received. The request to access data may include credentials (e.g., username, username and password, or the like) of the user requesting access.

At step 302, in response to receiving the request to access data, one or more credential evaluations functions may be enabled. For instance, content of the request to access data may trigger a browser extension to initiate one or more credential evaluation functions including, for instance, generating and storing an event record. The event record may include the request, the credentials, a URL associated with the website, a date, a time, and the like. The event record may be stored in a database. In some examples, the triggering content may include a field for a username of a user, input of a username of the user, and the like. In some arrangements, the stored event record might not store a password associated with the request to access data and, instead, may store the username without the password.

At step 304, the event record may be analyzed to evaluate the website associated with the request to access data. For instance, the website may be analyzed to determine whether it has been flagged as having a business designation or a personal designation. Additionally or alternatively, content of the website may be analyzed (e.g., using machine learning) to determine a designation of "business" or "personal." Further, one or more additional event details (e.g., date, time, or the like) may be used to determine the designation of the website.

At step 306, the event record may be further analyzed to determine a designation associated with credentials submitted. For instance, the credentials may be analyzed to determine whether they correspond to a "business" designation or a "personal" designation. For instance, credentials assigned or provided to the user by an employer or other entity implementing the credential evaluation computing platform 110 may be considered "business" credentials while all other credentials may be considered "personal." Accordingly, if the entity assigning the credentials has a policy that prevents users from using "business" credentials for personal use (e.g., to prevent unauthorized access) the arrangements described herein may control use of the credentials to ensure compliance.

In some examples, additional even data, such as date, time, job functions, and the like, may be used to determine a designation for the credentials. For instance, machine learning may be used to analyze the credentials and additional even details to determine a designation for the credentials.

At step 308, a determination may be made as to whether the designation of the website matches the designation of the credentials. If so, at step 310, access to the requested data may be provided.

If the designation of the website does not match the designation of the credentials (e.g., website designated for personal use while credentials designated for business use, or vice versa), at step 312, a risk associated with providing the requested access may be determined. For instance, machine learning may be used to analyze risk associated with accessing a particular website using particular credentials. For instance, more secure websites, even if designated as personal, may have less risk associated with using business credentials than other personal websites having fewer security measures in place. Accordingly, a risk score may be generated that is based on one or more factors, such as website, security measures in place, time of day, and the like. In some examples, a URL may be assigned a risk value and the risk value may be combined with risk values associated with one or more other factors (e.g., time of day, day of week, username, or the like) to determine a risk score associated with the event.

At step 314, one or more mitigating actions to reduce risk may be identified. For instance, a generated risk score may be compared to one or more risk thresholds in order to identify one or more mitigating actions. Additionally or alternatively, one or more mitigating actions may be identified based on the website being accessed, time and date of requested access, or the like. Some example mitigating actions may be include preventing access to the requested website or data, generating and transmitting a notification to a user or user supervisor, storing the event to maintain an auditable trail of access requests, and the like.

At step 316, the identified one or more mitigating actions may be executed. For instance, instructions or commands to execute the one or more mitigating actions may be generated and executed or transmitted to one or more other computing devices or systems and executed. \

Figure 4:
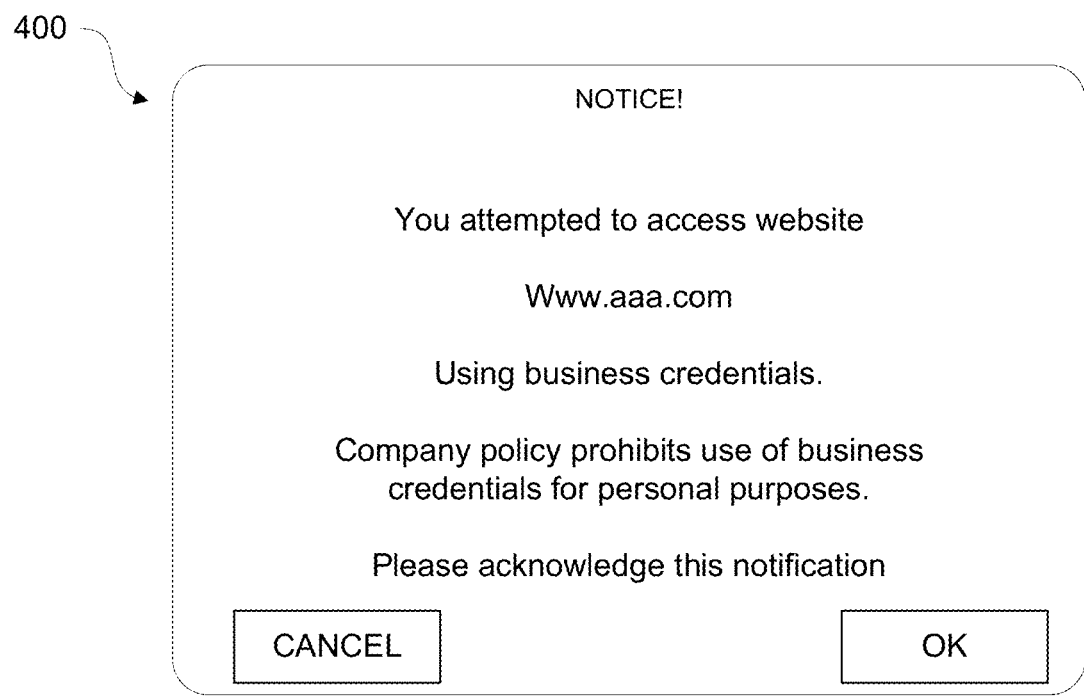
FIG. 4 illustrates one example interactive user interface that may be generated and/or displayed in accordance with one or more aspects described herein.

FIG. 4 illustrates one example notification that may be generated and transmitted to, for example, local user computing device 150. Interface 400 includes an indication that the user attempted to access a particular website with improper credentials. The interface 400 further includes a notification that this is against company policy and requests acknowledgement from the user. The user may select "OK" or "CANCEL" and the selection may be used to generate execution response data that may be transmitted to the credential evaluation computing platform 110.

Accordingly, arrangements described herein may be used to evaluate and control employee credential use during the course of business. The arrangements described herein provide for detection of improper use of credentials, as well as evaluation of risk associated with that use and generation and execution of one or more mitigating actions. One or more of the aspects or functions described herein, such as detecting a triggering event, generating an event record, analyzing a website and credentials, identifying whether website designation matches credential designation, identifying risk, identifying mitigating actions, and/or executing mitigating actions may be performed in real-time or near real-time in order to quickly assess risk and mitigate that risk.

As discussed, in some examples, in order to accurately monitor business user's credential use, all traffic to all web browsers may be monitored for potential triggering occurrences (e.g., an authentication event). As also discussed, different browser extensions may be used with different web browsers without departing from the invention. Further, in some examples, every web browser used within the enterprise organization may have the browser extension embedded therein. Accordingly, if a user attempted us to a web browser without the web extension embedded, the web browser would be disabled. For instance, in order for the web browser to communicate and authenticate with a third party or other system (e.g., to provide access to the data) the browser extension would have to be loaded into the web browser.

In some arrangements, the event record generated for each triggering occurrence may be stored. Accordingly, even if it is determined that a website designation matches a credential designation, the event record may be stored in order to update and/or validate machine learning datasets, maintain an auditable trail of website usage during the course of business, and the like.

While aspects described herein are generally directed to use of an enterprise organization username or identifier for a personal use, in some examples, a password corresponding to the organization username or identifier may also be detected. Accordingly, if the combination of business username and password is used for personal purposes, risk of unauthorized use or capture of the credentials may increase. Accordingly, in some examples, those occurrences may be detected and one or more mitigating actions may be identified and executed.

As discussed herein, a risk score associated with the requested access, credentials used, website accessed, and the like, may be determined. In some examples, the risk score may be based, at least in part, on various factors, such as data accessed via the website (e.g., financial, personal, or the like), time of day being accessed, type of website being accessed, the individual requesting access (e.g., high risk users may be identified), and the like. In some examples, a high risk user may be a user having one or more identified high risk types of access, access to more data than a typical user, or the like.

Further, a risk score may be generated for each event. As scores are generated per event, in some examples, scores for one or more users, user groups, or the like, may be compiled to identify an ongoing issue with a user, an anomaly or potential unauthorized activity event, or the like.

Figure 5:
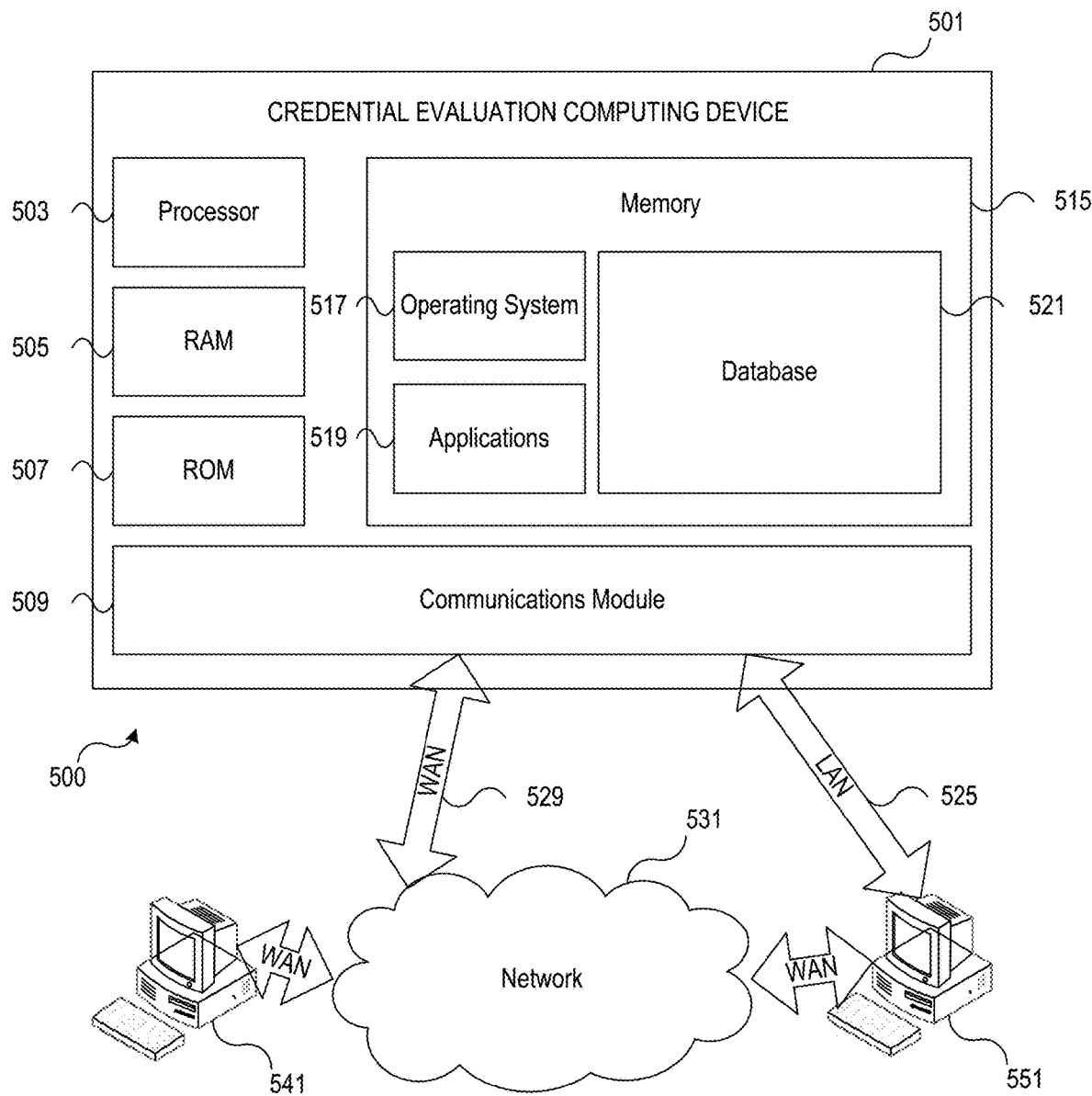
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include credential evaluation computing device 501 having processor 503 for controlling overall operation of credential evaluation computing device 501 and its associated components, including Random Access Memory (RAM) 505, Read-Only Memory (ROM) 507, communications module 509, and memory 515. Credential evaluation computing device 501 may include a variety of computer readable media. Computer readable media may be any available media that may be accessed by credential evaluation computing device 501, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by credential evaluation computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on credential evaluation computing device 501. Such a processor may execute computer-executable instructions stored on a computer-readable medium.

Software may be stored within memory 515 and/or storage to provide instructions to processor 503 for enabling credential evaluation computing device 501 to perform various functions as discussed herein. For example, memory 515 may store software used by credential evaluation computing device 501, such as operating system 517, application programs 519, and associated database 521. Also, some or all of the computer executable instructions for credential evaluation computing device 501 may be embodied in hardware or firmware. Although not shown, RAM 505 may include one or more applications representing the application data stored in RAM 505 while credential evaluation computing device 501 is on and corresponding software applications (e.g., software tasks) are running on credential evaluation computing device 501.

Communications module 509 may include a microphone, keypad, touch screen, and/or stylus through which a user of credential evaluation computing device 501 may provide input, and may also include one or more of a speaker for providing audio output and a video display device for providing textual, audiovisual and/or graphical output. Computing system environment 500 may also include optical scanners (not shown).

Credential evaluation computing device 501 may operate in a networked environment supporting connections to one or more remote computing devices, such as computing devices 541 and 551. Computing devices 541 and 551 may be personal computing devices or servers that include any or all of the elements described above relative to credential evaluation computing device 501.

The network connections depicted in FIG. 5 may include Local Area Network (LAN) 525 and Wide Area Network (WAN) 529, as well as other networks. When used in a LAN networking environment, credential evaluation computing device 501 may be connected to LAN 525 through a network interface or adapter in communications module 509. When used in a WAN networking environment, credential evaluation computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
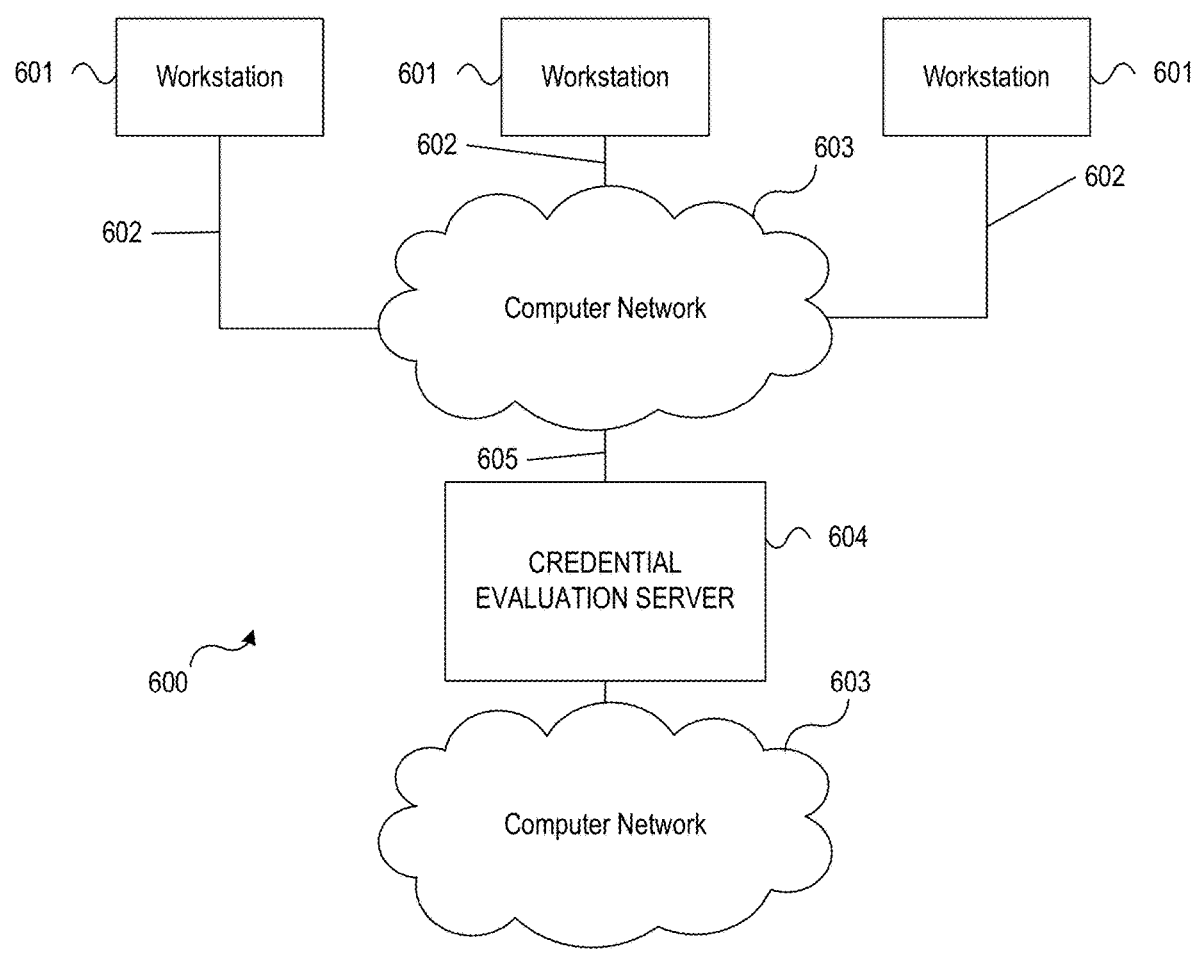
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to credential evaluation server 604. In system 600, credential evaluation server 604 may be a server, processor, computer, or data processing device, or combination of the same, configured to perform the functions and/or processes described herein. Server 604 may be used to receive requests to access a website, analyze a website and credentials to determine whether designations match, determine a risk score associated with the request and credentials, identify one or more mitigating actions, transmit and execute the one or more mitigating actions, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and credential evaluation server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive a request to access data via a website, the request being made via a web browser and including user credentials associated with a user requesting to access the data;
      determine whether the web browser includes an embedded browser extension for credential evaluation;
      responsive to determining that the web browser does not include the embedded browser extension for credential evaluation, disable the web browser; and
      responsive to determining that the web browser does include the embedded browser extension for credential evaluation:
         receive, via the browser extension embedded in the web browser, an instruction to initiate credential evaluation functions;
         initiate the credential evaluation functions based on the instruction;
         generate an event record associated with request to access data, the event record including a uniform resource locator (URL) of the website and the user credentials;
         store the generated event record;
         analyze the event record to identify a designation of the website, wherein the designation of the website is one of: business or personal;
         analyze the event record to identify a designation of the credentials of the user requesting to access the data, wherein the designation of the credentials is one of: business or personal;
         compare the designation of the website to the designation of the credentials to determine whether a match exists;
         responsive to determining that the designation of the website matches the designation of credentials, provide the requested access to data;
         responsive to determining that the designation of the website does not match the designation of the credentials:
            identify one or more mitigating actions; and
            execute the one or more mitigating actions.

2. The computing platform of claim 1, wherein the event record further including additional event details.

3. The computing platform of claim 2, wherein the additional event details include a time of the request and a date of the request.

4. The computing platform of claim 2, wherein analyzing the event record to identify a designation of the website is performed using machine learning to analyze the URL and the additional event details.

5. The computing platform of claim 1, wherein identifying one or more mitigating actions further includes:
   evaluating a risk associated with the website and the credentials of the user;
   determining a risk score associated with the risk;
   comparing the risk score to one or more risk score thresholds; and
   identifying the one or more mitigating actions based on the comparing.

6. The computing platform of claim 1, wherein one or more mitigating actions include one or more of: preventing access to the data, generating and displaying a notification on a user device, and generating and displaying a notification on a supervising user device.

7. A method, comprising:
   receiving, by a computing platform having at least one processor and memory, a request to access data via a website, the request being made via a web browser and including user credentials associated with a user requesting to access the data;
   determine whether the web browser includes an embedded browser extension for credential evaluation;

when it is determined that the web browser does not include the embedded browser extension for credential evaluation, disabling the web browser; and when it is determined that the web browser does include the embedded browser extension for credential evaluation:

receiving, by the at least one processor and via the browser extension embedded in the web browser, an instruction to initiate credential evaluation functions;

initiating, by the at least one processor, the credential evaluation functions based on the instruction;

generating, by the at least one processor, an event record associated with request to access data, the event record including a uniform resource locator (URL) of the website and the user credentials;

storing, by the at least one processor, the generated event record;

analyzing, by the at least one processor, the event record to identify a designation of the website, wherein the designation of the website is one of: business or personal;

analyzing, by the at least one processor, the event record to identify a designation of the credentials of the user requesting to access the data, wherein the designation of the credentials is one of: business or personal;

comparing, by the at least one processor, the designation of the website to the designation of the credentials to determine whether a match exists;

when it is determined that the designation of the website matches the designation of credentials, providing, by the at least one processor, the requested access to data;

when it is determined that the designation of the website does not match the designation of the credentials:

identifying, by the at least one processor, one or more mitigating actions; and executing, by the at least one processor, the one or more mitigating actions.

8. The method of claim 7, wherein the event record further including additional event details.

9. The method of claim 8, wherein the additional event details include a time of the request and a date of the request.

10. The method of claim 8, wherein analyzing the event record to identify a designation of the website is performed using machine learning to analyze the URL and the additional event details.

11. The method of claim 7, wherein identifying one or more mitigating actions further includes:

evaluating, by the at least one processor, a risk associated with the website and the credentials of the user;

determining, by the at least one processor, a risk score associated with the risk;

comparing, by the at least one processor, the risk score to one or more risk score thresholds; and identifying, by the at least one processor, the one or more mitigating actions based on the comparing.

12. The method of claim 7, wherein one or more mitigating actions include one or more of: preventing access to the data, generating and displaying a notification on a user device, and generating and displaying a notification on a supervising user device.

13. One or more non-transitory computer-readable media storing instructions that, when executed by a computing platform comprising at least one processor, memory, and a communication interface, cause the computing platform to:

receive a request to access data via a website, the request being made via a web browser and including user credentials associated with a user requesting to access the data;

determine whether the web browser includes an embedded browser extension for credential evaluation;

responsive to determining that the web browser does not include the embedded browser extension for credential evaluation, disable the web browser; and responsive to determining that the web browser does include the embedded browser extension for credential evaluation:

receive, via the browser extension embedded in the web browser, an instruction to initiate credential evaluation functions;

initiate the credential evaluation functions based on the instruction;

generate an event record associated with request to access data, the event record including a uniform resource locator (URL) of the website and the user credentials;

store the generated event record;

analyze the event record to identify a designation of the website, wherein the designation of the website is one of: business or personal;

analyze the event record to identify a designation of the credentials of the user requesting to access the data, wherein the designation of the credentials is one of: business or personal;

compare the designation of the website to the designation of the credentials to determine whether a match exists;

responsive to determining that the designation of the website matches the designation of credentials, provide the requested access to data;

responsive to determining that the designation of the website does not match the designation of the credentials:

identify one or more mitigating actions; and execute the one or more mitigating actions.

14. The one or more non-transitory computer-readable media of claim 13, wherein the event record further including additional event details.

15. The one or more non-transitory computer-readable media of claim 14, wherein the additional event details include a time of the request and a date of the request.

16. The one or more non-transitory computer-readable media of claim 14, wherein analyzing the event record to identify a designation of the website is performed using machine learning to analyze the URL and the additional event details.

17. The one or more non-transitory computer-readable media of claim 13, wherein identifying one or more mitigating actions further includes:

evaluating a risk associated with the website and the credentials of the user;

determining a risk score associated with the risk;

comparing the risk score to one or more risk score thresholds; and identifying the one or more mitigating actions based on the comparing.

18. The one or more non-transitory computer-readable media of claim 13, wherein one or more mitigating actions include one or more of: preventing access to the data, generating and displaying a notification on a user device, and generating and displaying a notification on a supervising user device.

\* \* \* \* \*